United States Patent
Takai

(10) Patent No.: US 7,454,168 B2
(45) Date of Patent: Nov. 18, 2008

(54) RADIO COMMUNICATION SYSTEM, BASE STATION APPARATUS, AND DOWNLINK TRANSMISSION DIRECTING CHARACTERISTIC METHOD USED THEREFOR

(75) Inventor: Kenichi Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 10/543,500

(22) PCT Filed: Jan. 16, 2004

(86) PCT No.: PCT/JP2004/000307

§ 371 (c)(1),
(2), (4) Date: Jul. 27, 2005

(87) PCT Pub. No.: WO2004/068883

PCT Pub. Date: Aug. 12, 2004

(65) Prior Publication Data

US 2006/0135062 A1 Jun. 22, 2006

(30) Foreign Application Priority Data

Jan. 29, 2003 (JP) ............................. 2003-019606

(51) Int. Cl.
*H04B 7/14* (2006.01)
(52) U.S. Cl. ............. 455/25; 455/63.4; 455/562.1; 455/13.3
(58) Field of Classification Search .............. 455/562.1, 455/25, 63.4, 422, 279.1, 517, 522, 69, 532.1, 455/443, 442, 424, 562, 446; 370/342, 328, 370/310
See application file for complete search history.

(56) References Cited

U.S. PATENT DOCUMENTS 6,236,866 B1 * 5/2001 Meyer et al. ............. 455/562.1
6,459,895 B1 * 10/2002 Hastings et al. ............. 455/424

(Continued)

FOREIGN PATENT DOCUMENTS

JP 6-504170 A 5/1994

(Continued)

OTHER PUBLICATIONS

"W-CDMA Mobile Communication Systems, Second Chapter: Radio Transmission Scheme", edited by Keiji Tachikawa, Maruzen, Jun. 25, 2001, pp. 79-86.

*Primary Examiner*—Tan Trinh
(74) *Attorney, Agent, or Firm*—Sughrue Mion, PLLC

(57) ABSTRACT

A communication bit rate computing unit (24) computes the cumulative bit rate of downlink communication data, at which a base station communicates with a terminal, and totalizes the bit rates for each sector area. A amplitude/phase control unit (23) checks whether the cumulative bit rate for each sector area, reported from the communication bit rate computing unit (24), is higher than a first threshold or lower than a second threshold. If the cumulative bit rate is higher than the first threshold, the amplitude/phase control unit (23) performs directing characteristic control so as to narrow the area range of the corresponding sector area to a range smaller than a standard area range. If the cumulative bit rate is lower than the second threshold, the amplitude/phase control unit (23) performs directing characteristic control so as to widen the area range of the corresponding sector area to a range larger than the standard area range.

18 Claims, 7 Drawing Sheets

U.S. PATENT DOCUMENTS

| | | | |
|---|---|---|---|
| 6,778,839 B2 * | 8/2004 | Valkealahti | 455/522 |
| 7,072,692 B1 * | 7/2006 | Katz et al. | 455/562.1 |
| 2002/0058505 A1 * | 5/2002 | Kim et al. | 455/427 |
| 2003/0179833 A1 * | 9/2003 | Porco et al. | 375/297 |
| 2005/0107106 A1 * | 5/2005 | Valkealahti et al. | 455/522 |

FOREIGN PATENT DOCUMENTS

| | | | |
|---|---|---|---|
| JP | 2002-521937 A | 7/2002 | |
| JP | 2002-246970 A | 8/2002 | |
| JP | 2002-345048 A | 11/2002 | |
| KR | 2002-0043155 A | 6/2002 | |
| WO | WO 01/47146 A | 6/2001 | |
| WO | WO 01/47146 A1 | 6/2001 | |

\* cited by examiner

US 7,454,168 B2

RADIO COMMUNICATION SYSTEM, BASE STATION APPARATUS, AND DOWNLINK TRANSMISSION DIRECTING CHARACTERISTIC METHOD USED THEREFOR

TECHNICAL FIELD

The present invention relates to a radio communication system, a base station apparatus, a downlink transmission directing characteristic control method used therefor, and a program therefor and, more particularly, to a reduction in interference between terminals in a radio communication system based on a CDMA (Code Division Multiple Access) scheme.

BACKGROUND ART

A radio communication system based on the CDMA scheme is a communication scheme characterized in that interference between communication terminals is reduced by assigning codes with orthogonality to the respective communication terminals and multiplying communication signals by the codes. On the other hand, recent mobile communication systems have been standardized to support not only speech communication but also data communication of packets and the like. In a mobile communication system based on the CDMA scheme, power per bit can be increased by changing the spreading ratio (=chip rate after spreading/bit rate before spreading) of an orthogonal code in accordance with the bit rate at which communication is performed, and decreasing the spreading ratio and performing code multiplexing with respect to communication terminals which are communicating with each other at a higher bit rate.

As shown in FIG. 8, an adaptive antenna base station apparatus in the above conventional mobile communication system comprises a base station control unit 1, baseband processing unit 8, radio transmitting/receiving units 31 to 3n, and transmission/reception antennas 41 to 4n. The base station control unit 1 is connected to the constituent elements of the base station apparatus (including the baseband processing unit 8, the radio transmitting/receiving units 31 to 3n, and constituent elements (not shown) which performs speech and data processing and the like) except for the transmission/reception antennas 41 to 4n, and has a function of interfacing with a communication/host station apparatus (not shown) for communication of control/monitoring data. The baseband processing unit 8 is connected to the transmission/reception antennas 41 to 4n through the radio transmitting/receiving units 31 to 3n, and has a function of performing encoding processing and decoding processing for communication data transmitted/received to/from a communication terminal (not shown) through the transmission/reception antennas 41 to 4n. That is, the baseband processing unit 8 comprises an encoding processing unit 81 which performs encoding computation for transmission data, a decoding processing unit 82 which performs decoding computation for reception data, and an amplitude/phase control unit 83 which performs amplitude/phase computation for communication data for directivity control on the adaptive antennas. Each of the radio transmitting/receiving units 31 to 3n is connected to a corresponding one of the transmission/reception antennas 41 to 4n and has a function of converting data from the baseband processing unit 8 into data in the radio frequency band and transmitting it through a corresponding one of the transmission/reception antennas 41 to 4n, and a function of converting a signal in the radio frequency band received from a corresponding one of the transmission/reception antennas 41 to 4n into a signal in the baseband and outputting it to the baseband processing unit 8.

With regard to the above adaptive antenna base station apparatus, studies have been made on an arrangement in which the downlink directing characteristics are controlled in accordance with the uplink communication error rate or reception power or the downlink error rate or the like reported from a communication terminal (e.g., "W-CDMA Mobile Communication Systems, Second Chapter: Radio Transmission Scheme", edited by Keiji Tachikawa, Maruzen, Jun. 25, 2001, pp. 79-86). In addition, a method of improving interference characteristics from a high-power, high-speed transmission user to a low-speed transmission user by array antenna directivity control on a downlink channel based on the CDMA scheme has been proposed (see, e.g., Japanese Patent Laid-Open No. 2002-246970: pp. 5-9, FIG. 1). According to this method, after a despreading unit despreads an uplink channel spread-spectrum signal from a mobile station (communication terminal), a radio wave arrival direction estimating means estimates the direction of the mobile station, and an individual transmission power determining means determines transmission power from the data transmission speed determined by a data transmission speed determining means for the mobile station. A side-lobe level setting means determines a side-lobe level suppression value with respect to a main lobe from the data transmission speed ratio or spread spectrum ratio between high-speed transmission and low-speed transmission, and a null setting means suppresses interference near the main lobe. A transmission directivity pattern forming means then determines a transmission pattern.

In a conventional radio communication system, however, owing to the characteristics of radio communication, the propagation conditions between a base station and a communication terminal always change, and hence it is difficult to stably maintain perfect orthogonality between communication channels. In practice, this often causes interference in communication with other communication terminals. In a radio communication system based on the CDMA scheme, therefore, an increase/decrease in the communication capacity of the system is greatly influenced by how such interference is reduced. In addition, in the conventional radio communication system, the spreading ratio of orthogonal codes is changed in accordance with the bit rate at which communication is performed, and the spreading ratio of a communication terminal which is performing communication at a higher bit rate is decreased to perform code multiplexing. In the conventional radio communication system, therefore, the influence (interference) of one communication terminal with a high communication bit rate on the system is higher than that of a low-speed speech terminal. As a result, when communication terminals with high communication bit rates concentrate on one area (e.g., a sector), the capacity in the area may reach its upper limit although the number of communication terminals in the area looks small. This problem cannot be solved even by the technique in the above patent reference.

DISCLOSURE OF INVENTION

It is an object of the present invention to provide a radio communication system, a base station apparatus, a downlink transmission directing characteristic control method used therefor, and a program therefor which can solve the above problems and minimize the influence of downlink interference by high-communication-rate terminals in the same sector.

In order to achieve the above object, according to the present invention, there is provided a radio communication system comprising a base station apparatus having antennas whose directivity can be controlled, and a communication terminal which performs radio communication with the base station apparatus within a service area of the base station apparatus, the base station apparatus comprising means for calculating a cumulative value of downlink communication bit rates for each of a plurality of sector areas formed by dividing a cell indicating the service area of the base station apparatus, and control means for performing area control so as to make downlink communication bit rates per sector area substantially uniform on the basis of the calculated cumulative values of downlink communication bit rates.

In addition, according to the present invention, there is provided a base station apparatus comprising antennas whose directivity can be controlled, and means for calculating a cumulative value of downlink communication bit rates for each of a plurality of sector areas formed by dividing a cell indicating the service area of the base station apparatus, and control means for performing area control so as to make downlink communication bit rates per sector area substantially uniform on the basis of the calculated cumulative values of downlink communication bit rates.

Furthermore, according to the present invention, there is provided a downlink transmission directing characteristic control method for a base station apparatus having antennas whose directivity can be controlled, wherein the base station apparatus comprises the step of calculating a cumulative value of downlink communication bit rates for each of a plurality of sector areas formed by dividing a cell indicating the service area of the base station apparatus, and the step of performing area control so as to make downlink communication bit rates per sector area substantially uniform on the basis of the calculated cumulative values of downlink communication bit rates.

Moreover, according to the present invention, there is provided a program for a downlink transmission directing characteristic control method for a base station apparatus having antennas whose directivity can be controlled, the program causing a computer to execute a process of calculating a cumulative value of downlink communication bit rates for each of a plurality of sector areas formed by dividing a cell indicating the service area of the base station apparatus, and a process of performing area control so as to make downlink communication bit rates per sector area substantially uniform on the basis of the calculated cumulative values of downlink communication bit rates.

BEST MODE FOR CARRYING OUT THE INVENTION

Figure 1:
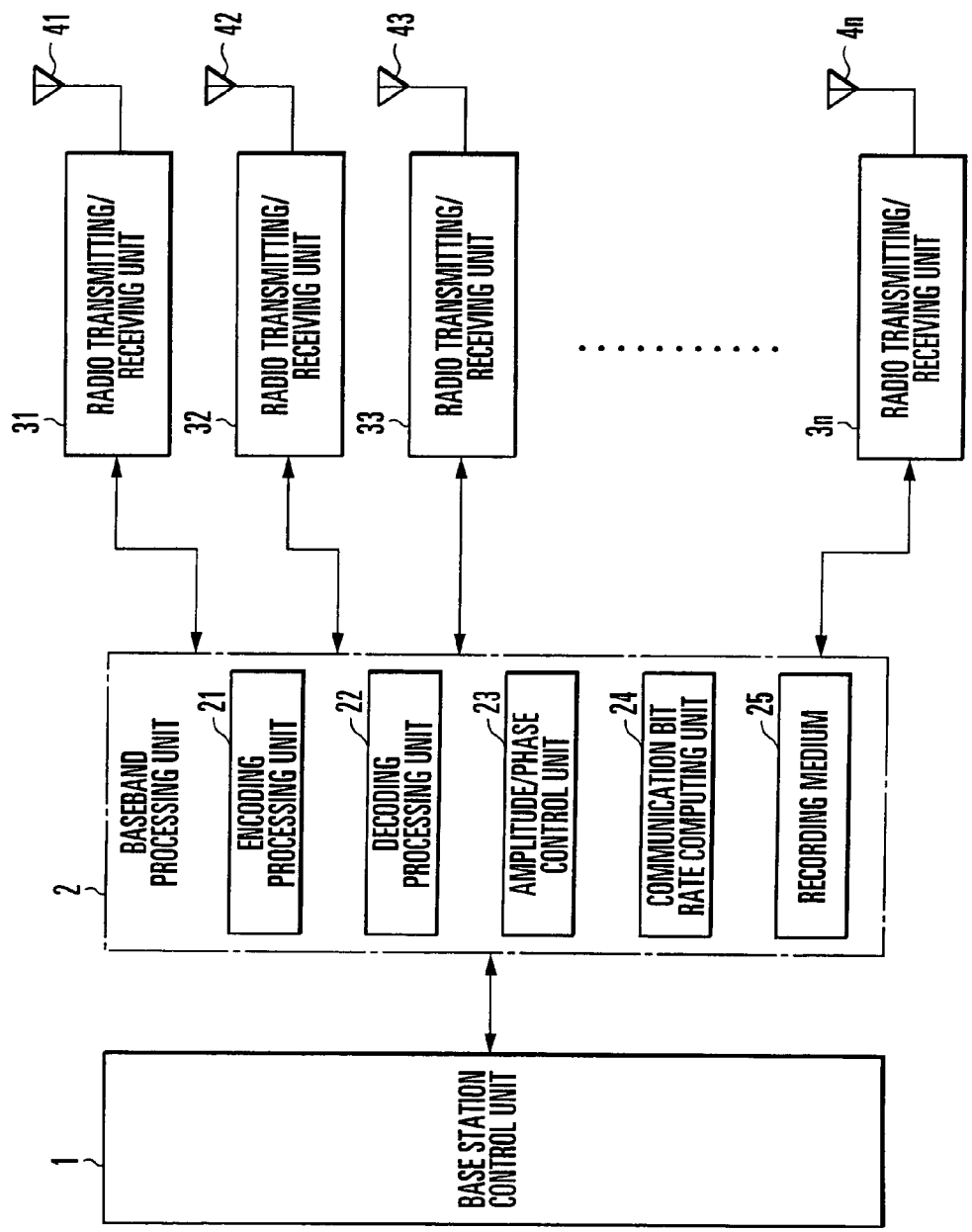
FIG. 1 is a block diagram showing the arrangement of a base station apparatus according to an embodiment of the present invention.

The embodiments of the present invention will be described next with reference to the accompanying drawings. FIG. 1 is a block diagram showing the arrangement of a base station apparatus according to an embodiment of the present invention. Referring to FIG. 1, the base station apparatus according to an embodiment of the present invention is an adaptive antenna base station apparatus which is used in a radio communication system, and more particularly, a mobile communication system using the CDMA (Code Division Multiple Access) scheme, and is designed to perform downlink transmission directing characteristic control in accordance with a communication bit rate for each sector (obtained by dividing a cell indicating the service area of a base station).

Under the above background, the base station apparatus of this embodiment performs area control to make a downlink communication bit rate per area as uniform as possible in consideration of the fact that interference in downlink communication (communication from a base station to a terminal) in the radio communication system based on the CDMA scheme influences the system capacity. In this case, the above area indicates a service area obtained by dividing a cell. This divided service area will be referred to as a sector area.

The base station apparatus according to an embodiment of the present invention comprises a base station control unit 1, a baseband processing unit 2, radio transmitting/receiving units 31 to 3n, and transmission/reception antennas 41 to 4n. Referring to FIG. 1, the number of constituent elements with the same term does not mean any necessary number of constituent elements in executing the embodiment, but is shown as an example for explanation.

The base station control unit 1 is connected to the constituent elements of the base station apparatus (including the baseband processing unit 2, the radio transmitting/receiving units 31 to 3n, and constituent elements (not shown) which performs speech and data processing and the like) except for the transmission/reception antennas 41 to 4n, and has a function of interfacing with a communication/host station apparatus (not shown) for communication of control/monitoring data. The baseband processing unit 2 is connected to the transmission/reception antennas 41 to 4n through the radio transmitting/receiving units 31 to 3n, and has a function of performing encoding processing and decoding processing for communication data transmitted/received to/from a communication terminal through the antennas. That is, the baseband processing unit 2 comprises an encoding processing unit 21 which performs encoding computation for transmission data, a decoding processing unit 22 which performs decoding computation for reception data, an amplitude/phase control unit 23 which performs amplitude/phase computation for communication data for directivity control on the adaptive antennas, a communication bit rate computing unit 24 which performs communication rate computation for communication data, and a recording medium 25 which stores programs (computer-executable programs) for implementing the processes in the respective units. Each of the radio transmitting/ receiving units 31 to 3*n* is connected to a corresponding one of the transmission/reception antennas 41 to 4*n* and has a function of converting data from the baseband processing unit 2 into data in the radio frequency band and transmitting it through a corresponding one of the transmission/reception antennas 41 to 4*n*, and a function of converting a signal in the radio frequency band received from a corresponding one of the transmission/reception antennas 41 to 4*n* into a signal in the baseband and outputting it to the baseband processing unit 2.

Figure 2:
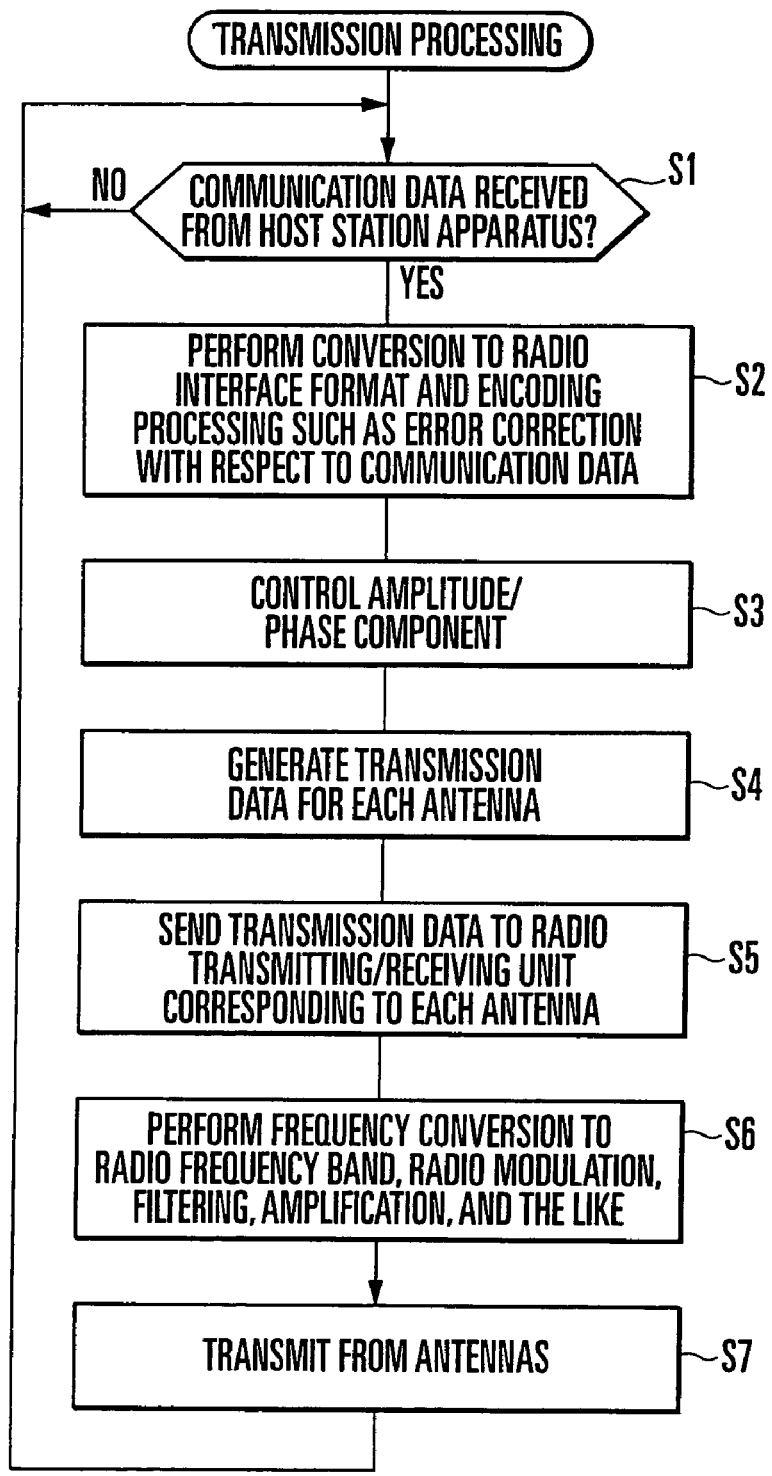
FIG. 2 is a flowchart showing the transmitting operation of the base station apparatus according to an embodiment of the present invention.
Figure 3:
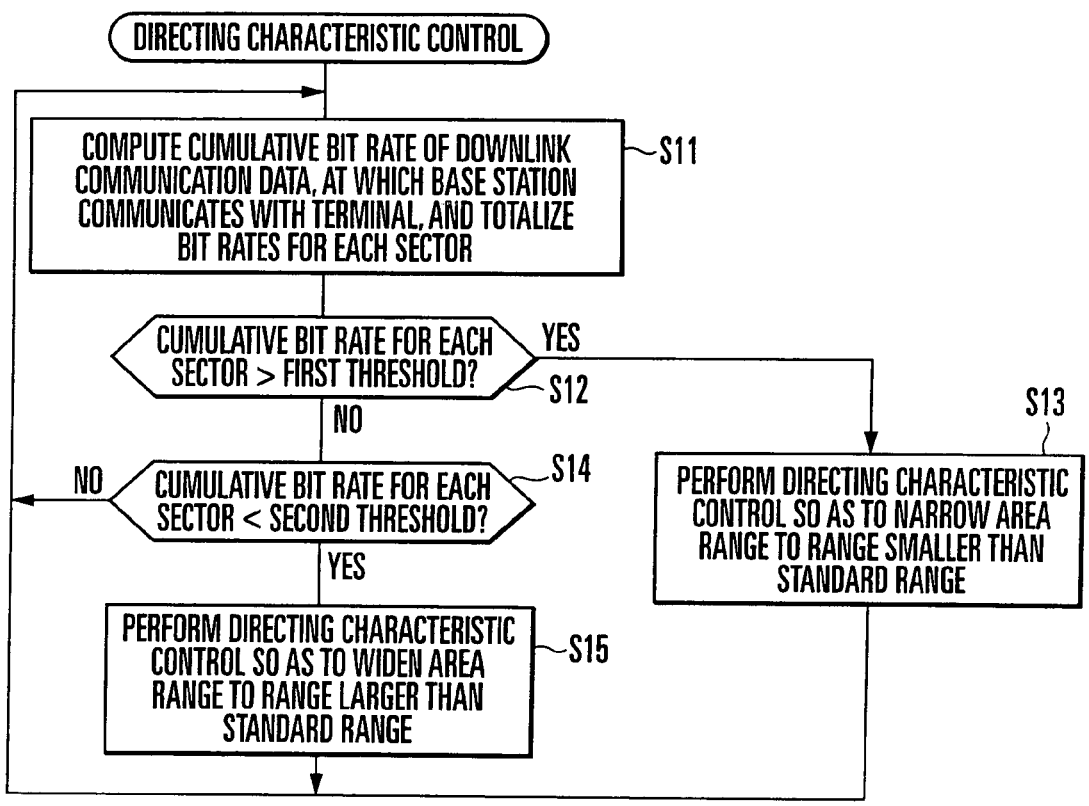
FIG. 3 is a flowchart showing directing characteristic control by an amplitude/phase control unit in FIG. 1.
Figure 4:
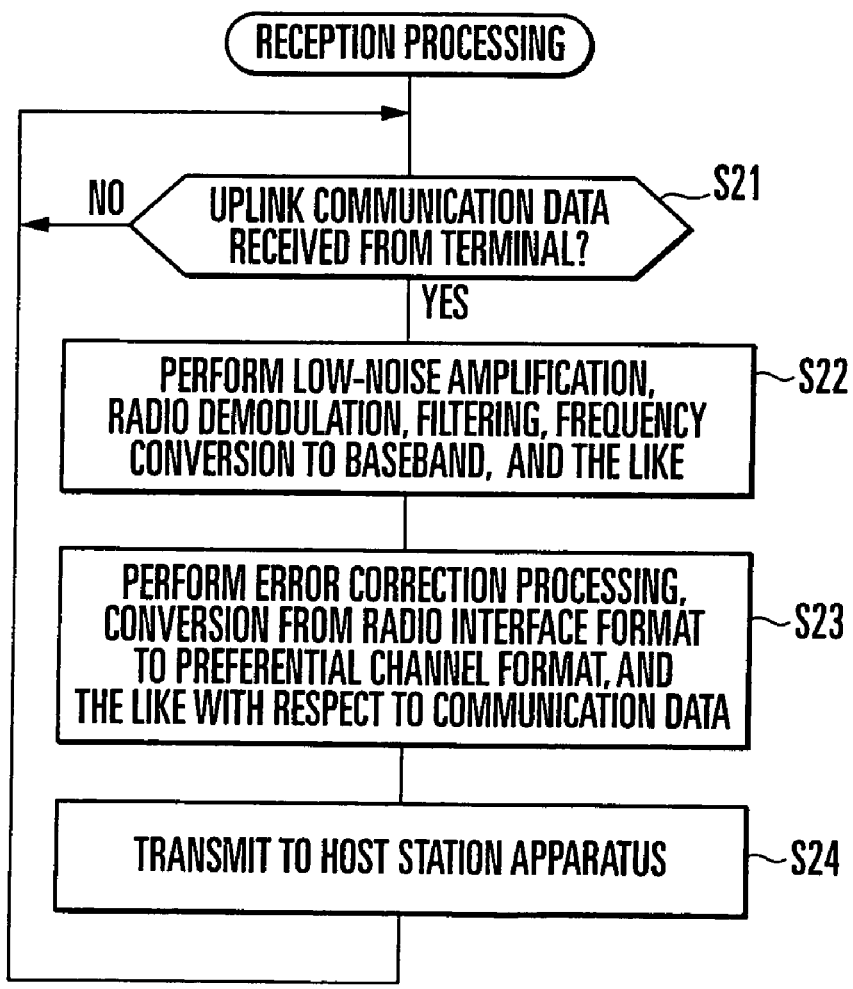
FIG. 4 is a flowchart showing the receiving operation of the base station apparatus according to an embodiment of the present invention.

FIG. 2 is a flowchart showing the transmitting operation of the base station apparatus according to an embodiment of the present invention. FIG. 3 is a flowchart showing directing characteristic control performed by the amplitude/phase control unit 23 in FIG. 1. FIG. 4 is a flowchart showing the receiving operation of the base station apparatus according to an embodiment of the present invention. The operation of the base station apparatus according to an embodiment of the present invention will be described with reference to FIGS. 1 to 4.

Downlink communication data to be transmitted from the base station apparatus to a communication terminal (mobile station) (not shown) is input from a host station apparatus to the base station apparatus. The communication data input from the host station apparatus is received by the base station control unit 1 (step S1 in FIG. 2) and is transferred to the baseband processing unit 2. In the baseband processing unit 2, the encoding processing unit 21 converts the communication data into data in a radio interface format, and performs encoding processing such as error correction (step S2 in FIG. 2). The amplitude and phase component of the encoded communication data are controlled by the amplitude/phase control unit 23 such that desired directivity is formed when the data is transmitted from the transmission/reception antennas 41 to 4*n*. (step S3 in FIG. 2), thereby generating transmission data for each of the transmission/reception antennas 41 to 4*n* (step S4 in FIG. 2).

The output data from the amplitude/phase control unit 23 is sent to the radio transmitting/receiving units 31 to 3*n* respectively corresponding to the transmission/reception antennas 41 to 4*n* (step S5 in FIG. 2). The radio transmitting/receiving units 31 to 3*n* perform frequency conversion to the radio frequency band, radio modulation, filtering, amplification, and the like (step S6 in FIG. 2). The resultant data is transmitted from the transmission/reception antennas 41 to 4*n* (step S7 in FIG. 2).

The communication bit rate computing unit 24 computes the cumulative bit rate of downlink communication data, at which the base station communicates with the communication terminal, and totalizes the computed data for each sector area (step S11 in FIG. 3). The amplitude/phase control unit 23 checks whether or not the cumulative bit rate for each sector area which is reported from the communication bit rate computing unit 24 is higher than a preset first threshold (step S12 in FIG. 3). If the cumulative bit rate is higher than the first threshold, the amplitude/phase control unit 23 performs directing characteristic control so as to narrow the area range of the corresponding sector area to a range smaller than a preset standard area range (step S13 in FIG. 3). When the cumulative bit rate becomes higher than the preset first threshold, the amplitude/phase control unit 23 checks whether or not the cumulative bit rate for each sector area which is reported from the communication bit rate computing unit 24 is lower than a preset second threshold (step S14 in FIG. 3). If the cumulative bit rate is lower than the second threshold, the amplitude/phase control unit 23 performs directing characteristic control to widen the area range of the corresponding sector area to a range larger than the standard area range (step S15 in FIG. 3). Assume that in this case, the "standard area range" corresponding to the width of a sector area indicates a sector area region when the communication bit rates in the respective sector areas are equal to each other.

In contrast, when radio waves sent from a communication terminal are received by the transmission/reception antennas 41 to 4*n*, uplink communication data from the communication terminal which is received by the base station is sent to the radio transmitting/receiving units 31 to 3*n* corresponding to the transmission/reception antennas 41 to 4*n* (step S21 in FIG. 4). The radio transmitting/receiving units 31 to 3*n* perform low-noise amplification, radio demodulation, filtering, frequency conversion to the baseband, and the like for the uplink communication data, and outputs the resultant data to the baseband processing unit 2 (step S22 in FIG. 4). In the baseband processing unit 2, the decoding processing unit 22 performs error correction processing, conversion from the radio interface format to a preferential channel format, and the like for the uplink communication data (step S23 in FIG. 4), and transmits the resultant data to the host station apparatus through the base station control unit 1 (step S24 in FIG. 4). Note that in the baseband processing unit 2, when an uplink reception signal from the radio transmitting/receiving units 31 to 3*n* is to be received, the signal can be processed by the decoding processing unit 22 through the amplitude/phase control unit 23 as in the case of a downlink signal. In either case, no limitations are imposed on a transmission path for uplink data, in particular, because no influence is imposed on the gist of this embodiment.

Figure 5:
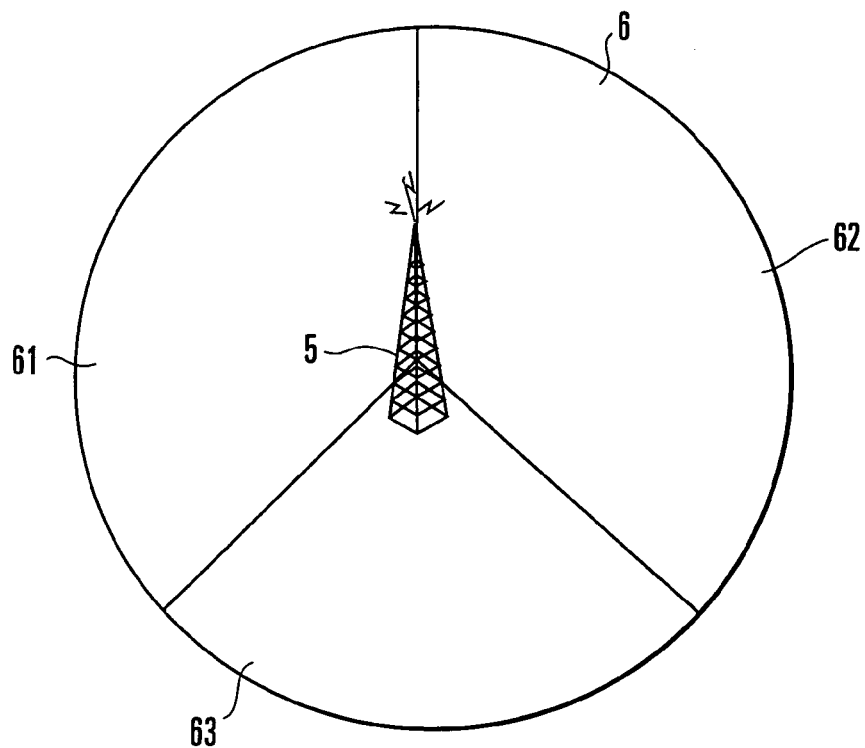
FIG. 5 is a schematic view showing the initial state of a cell supported by the base station apparatus according to an embodiment of the present invention.
Figure 6:
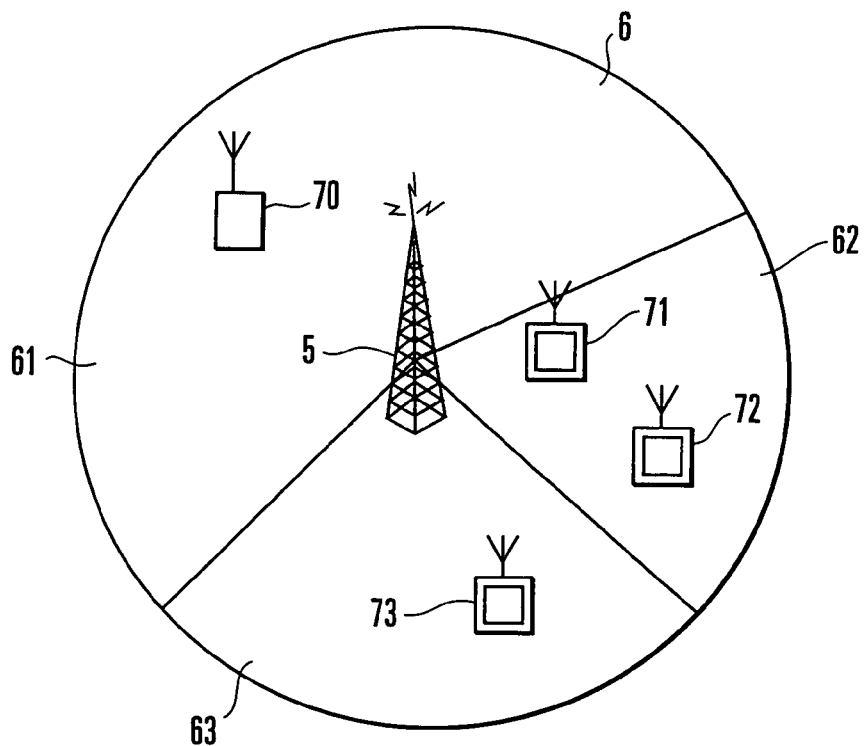
FIG. 6 is a schematic view showing the state of a cell after control is performed by the base station apparatus according to an embodiment of the present invention.

FIG. 5 is a schematic view showing the initial state of a cell (area) supported by the base station apparatus according to an embodiment of the present invention. FIG. 6 is a schematic view showing the state of a cell (area) controlled by the base station apparatus according to an embodiment of the present invention. How the directing characteristic in each sector area is changed by the base station apparatus according to an embodiment of the present invention will be described with reference to FIGS. 5 and 6. FIG. 5 schematically shows the area (initial state) serviced by the base station apparatus according to this embodiment. Reference numeral 5 denotes a base station apparatus according to an embodiment of the present invention. An area 6 indicates a cell serviced by the base station apparatus according to an embodiment of the present invention, and areas 61 to 63 indicate sector areas in the area 6.

It is not essential that the area 6 is comprised of the three sector areas 61 to 63. Referring to FIG. 5, as a state wherein the totals of downlink communication bit rates in the respective sector areas 61 to 63 are equal to each other (a state before downlink directing characteristics are dynamically controlled), a state wherein the three sector areas 61 to 63 are equal to each other is assumed. FIG. 6 shows a state wherein communication terminals are placed in the sector areas 61 to 63. Assume that in this case, a communication terminal 70 which is performing low-bit-rate communication (e.g., speech communication) is present in the sector area 61, communication terminals 71 and 72 which are performing high-bit-rate communication (e.g., video broadcasting) are present in the sector area 62, and a communication terminal 73 which is performing high-bit-rate communication is present in the sector area 63. At this time, the communication bit rate computing unit 24 of the baseband processing unit 2 calculates the cumulative downlink communication bit rates in the sector areas 61 to 63. As a result, an output is obtained, which indicates that the rate in the sector area 62 (where the high-bit-rate terminals 71 and 72 are present) is the highest, the rate in the sector area 63 (where the high-bit-rate terminal 73 is present) is the second highest, and the rate in the sector area 61 (where the low-bit-rate terminal 70 is present) is the third highest. This result is input to the amplitude/phase control unit 23 of the baseband processing unit 2, which in turn performs directing characteristic control such that the area range of the sector area 62 in which the cumulative bit rate is the highest is narrowed to the smallest range, the range of the sector area 63 is narrowed to the second smallest range, and the range of the sector area 61 is narrowed to the third smallest range. Various kinds of methods are conceivable as a method of calculating cumulative bit rates (instantaneous values or statistics), and a method of controlling directing characteristics from the cumulative bit rate in each sector area (a method of calculating the inverse ratio of a bit rate, a method of calculating a difference, and the like). In this case, however, these methods are not specified because they have no significant influences on the apparatus arrangement according to this embodiment.

In this embodiment, a cumulative downlink communication bit rate is computed for each sector area, and the downlink directing characteristic is controlled in accordance with the computation result to narrow the area range of a sector area in which the communication bit rate is high. This makes it possible to reduce the area range influenced by interference. Therefore, the influence of downlink interference by high-communication-rate terminals in the same sector area can be minimized. In addition, in this embodiment, since directing characteristic control can be done to equalize the cumulative downlink communication bit rates in the respective sector areas, variations in the number of communication terminals which can be accommodated in the cell which the base station apparatus services can be smoothed. Furthermore, as in the conventional technique, control can be done on the basis of closed information within a base station instead of control based on report information (feedback) from a communication terminal. Therefore, this embodiment can be implemented independently of the function of a communication terminal.

Figure 7:
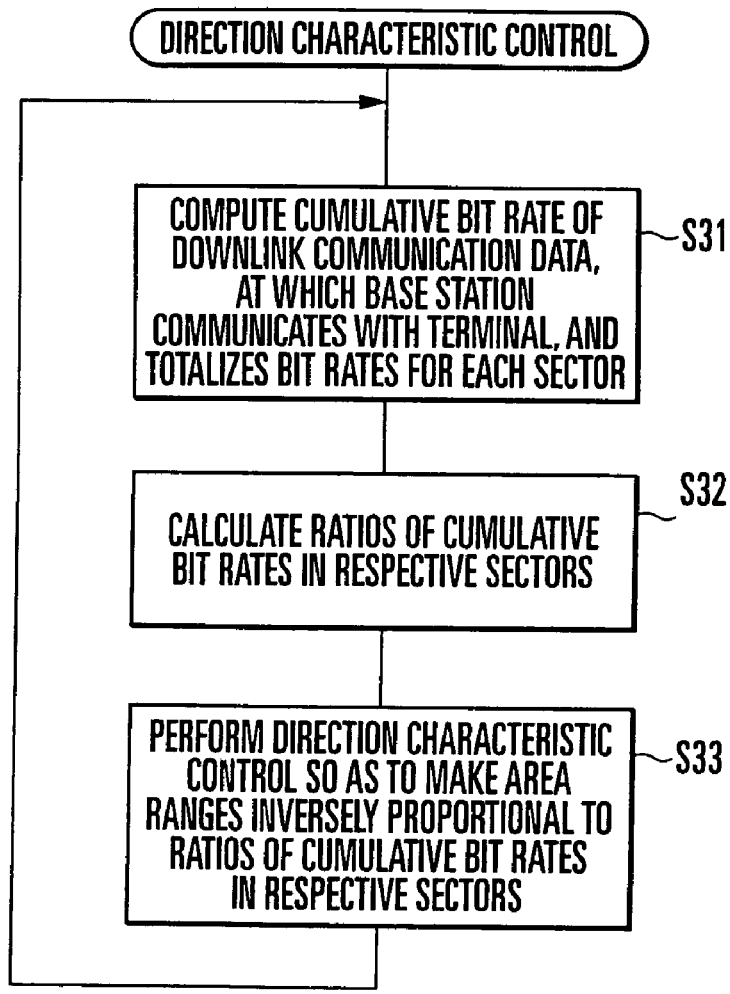
FIG. 7 is a flowchart showing directing characteristic control according to another embodiment of the present invention.
Figure 8:
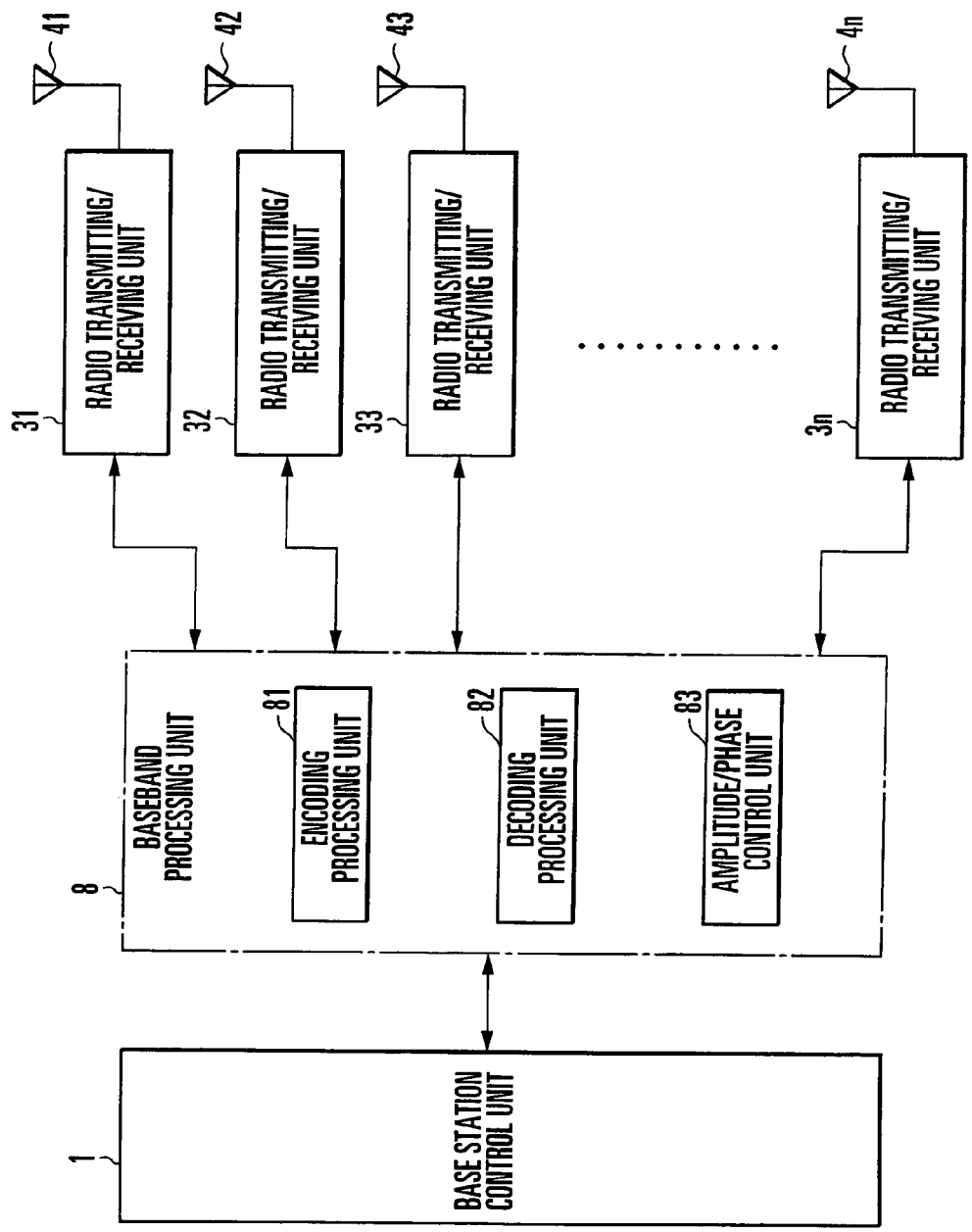
FIG. 8 is a block diagram showing the arrangement of a conventional base station apparatus.

FIG. 7 is a flowchart showing directing characteristic control according to another embodiment of the present invention. Since the arrangement of a base station apparatus according to another embodiment of the present invention is the same as that of the base station apparatus according to an embodiment of the present invention which is shown in FIG. 1, directing characteristic control according to another embodiment of the present invention will be described with reference to FIGS. 1 to 7.

A communication bit rate computing unit 24 computes the cumulative bit rate of downlink communication data, at which a base station communicates with a communication terminal, and totalizes the cumulative bit rates for each sector area (step S31 in FIG. 7). An amplitude/phase control unit 23 calculates the ratios of the cumulative bit rates in the respective sector areas reported from the communication bit rate computing unit 24 (step S32 in FIG. 7). When the ratios of the cumulative bit rates are calculated, the amplitude/phase control unit 23 performs directing characteristic control so as to make the ratios of the area ranges of the respective sector areas inversely proportional to the ratios of the cumulative bit rates in the respective sector areas (step S33 in FIG. 7).

In this embodiment, a cumulative downlink communication bit rate is computed for each sector area, and downlink directing characteristic control is performed to make the ratios of the area ranges of the respective sector areas inversely proportional to the ratios of the cumulative bit rates in the respective sector areas. This makes it possible to minimize the influence of downlink interference by high-communication-rate terminals in the same sector area without generating a gap between the sector areas.

As has been described above, according to the above embodiment, realizing the above arrangement and operation makes it possible to obtain the effect of minimizing the influence of downlink interference by high-communication-rate terminals in the same sector.

The invention claimed is:

1. A radio communication system comprising a base station apparatus having antennas whose directivity can be controlled, and a communication terminal which performs radio communication with said base station apparatus within a service area of said base station apparatus, characterized in that
said base station apparatus comprises
means for calculating a cumulative value of downlink communication bit rates for each of a plurality of sector areas formed by dividing a cell indicating the service area of said base station apparatus, and
control means for performing area control so as to make downlink communication bit rates per sector area substantially uniform on the basis of the calculated cumulative values of downlink communication bit rates.

2. A radio communication system according to claim 1, characterized in that said control means performs downlink transmission directing characteristic control on the plurality of antennas so as to adjust/control area ranges of the plurality of sector areas on the basis of the cumulative values of downlink communication bit rates.

3. A radio communication system according to claim 2, characterized in that said control means performs the downlink transmission directing characteristic control so as to narrow the area range of the sector area to a range smaller than a preset standard area range when the cumulative value of downlink communication bit rate is high.

4. A radio communication system according to claim 2, characterized in that said control means performs the downlink transmission directing characteristic control so as to widen the area range of the sector area to a range larger than the preset standard area range when the cumulative value of downlink communication bit rate is low.

5. A radio communication system according to claim 2, characterized in that said control means performs the downlink transmission directing characteristic control so as to make a ratio of the area ranges of the sector areas inversely proportional to a ratio of the cumulative values of downlink communication bit rates.

6. A base station apparatus characterized by comprising:
antennas whose directivity can be controlled;
means for calculating a cumulative value of downlink communication bit rates for each of a plurality of sector areas formed by dividing a cell indicating the service area of the base station apparatus; and
control means for performing area control so as to make downlink communication bit rates per sector area substantially uniform on the basis of the calculated cumulative values of downlink communication bit rates.

7. A base station apparatus according to claim 6, characterized in that said control means performs the downlink transmission directing characteristic control so as to narrow the area range of the sector area to a range smaller than a preset standard area range when the cumulative value of downlink communication bit rate is high.

8. A base station apparatus according to claim 6, characterized in that said control means performs the downlink transmission directing characteristic control so as to widen the area range of the sector area to a range larger than the preset standard area range when the cumulative value of downlink communication bit rate is low.

9. A base station apparatus according to claim 6, characterized in that said control means
   performs downlink transmission directing characteristic control on the plurality of antennas so as to adjust/control area ranges of the plurality of sector areas on the basis of the cumulative values of downlink communication bit rates, and
   performs the downlink transmission directing characteristic control so as to make a ratio of the area ranges of the sector areas inversely proportional to a ratio of the cumulative values of downlink communication bit rates.

10. A base station apparatus according to claim 6, wherein said control means performs downlink transmission directing characteristic control on the plurality of antennas so as to control area ranges of the plurality of sector areas on the basis of the cumulative values of downlink communication bit rates.

11. A base station apparatus according to claim 6, wherein said control means performs conversion to a radio interface format and encoding processing for error correction with respect to transmission data to the communication terminal.

12. A base station apparatus according to claim 6, wherein said control means performs error correction processing and decoding processing for conversion from a radio interface format with respect to reception data from the communication terminal.

13. A downlink transmission directing characteristic control method for a base station apparatus having antennas whose directivity can be controlled, characterized in that
   the base station apparatus comprises
      the step of calculating a cumulative value of downlink communication bit rates for each of a plurality of sector areas formed by dividing a cell indicating the service area of the base station apparatus; and
      the step of performing area control so as to make downlink communication bit rates per sector area substantially uniform on the basis of the calculated cumulative values of downlink communication bit rates.

14. A downlink transmission directing characteristic control method according to claim 13, characterized in that the step of performing the area control comprises the step of performing the downlink transmission directing characteristic control so as to narrow the area range of the sector area to a range smaller than a preset standard area range when the cumulative value of downlink communication bit rate is high.

15. A downlink transmission directing characteristic control method according to claim 13, characterized in that the step of performing the area control comprises the step of performing the downlink transmission directing characteristic control so as to widen the area range of the sector area to a range larger than the preset standard area range when the cumulative value of downlink communication bit rate is low.

16. A downlink transmission directing characteristic control method according to claim 13, characterized in that the step of performing the area control comprises
   the step of performing downlink transmission directing characteristic control on the plurality of antennas so as to adjust/control area ranges of the plurality of sector areas on the basis of the cumulative values of downlink communication bit rates, and
   the step of performing the downlink transmission directing characteristic control so as to make a ratio of the area ranges of the sector areas inversely proportional to a ratio of the cumulative values of downlink communication bit rates.

17. A downlink transmission directing characteristic control method according to claim 13, wherein the step of performing the area control comprises a step of performing downlink transmission directing characteristic control on the plurality of antennas so as to control area ranges of the plurality of sector areas on the basis of the cumulative values of downlink communication bit rates.

18. A program for a downlink transmission, stored on a computer-readable medium, directing characteristic control method for a base station apparatus having antennas whose directivity can be controlled, the program causing a computer to execute a process of calculating a cumulative value of downlink communication bit rates for each of a plurality of sector areas formed by dividing a cell indicating the service area of the base station apparatus, and a process of performing area control so as to make downlink communication bit rates per sector area substantially uniform on the basis of the calculated cumulative values of downlink communication bit rates.

* * * * *